United States Patent
Poranen (10) Patent No.: US 8,626,121 B2
(45) Date of Patent: Jan. 7, 2014

(54) TRACKING MOBILE COMMUNICATION DEVICES

(75) Inventor: Jouko Poranen, Espoo (FI)

(73) Assignee: 3 Step IT Group Oy, Vantaa (FI)

( * ) Notice: Subject to any disclaimer, the term of this patent is extended or adjusted under 35 U.S.C. 154(b) by 497 days.

(21) Appl. No.: 12/678,885

(22) PCT Filed: Sep. 12, 2008

(86) PCT No.: PCT/FI2008/050505
§ 371 (c)(1),
(2), (4) Date: May 7, 2010

(87) PCT Pub. No.: WO2009/037377
PCT Pub. Date: Mar. 26, 2009

(65) Prior Publication Data
US 2010/0216427 A1    Aug. 26, 2010

(30) Foreign Application Priority Data
Sep. 18, 2007   (EP) .................................... 07397032

(51) Int. Cl.
*H04W 12/12* (2009.01)
(52) U.S. Cl.
USPC ........... 455/410; 455/466; 455/558; 455/411; 455/551; 455/419; 709/203; 709/327
(58) Field of Classification Search
USPC ........... 455/410–411, 414.1, 466, 558, 456.1, 455/418–419; 709/203, 327
See application file for complete search history.

(56) References Cited

U.S. PATENT DOCUMENTS

| | | | | |
|---|---|---|---|---|
| 6,697,637 | B1* | 2/2004 | Willey | 455/551 |
| 7,761,883 | B2* | 7/2010 | Kasama | 719/327 |
| 8,036,707 | B2* | 10/2011 | Kumar | 455/558 |
| 2002/0016817 | A1* | 2/2002 | Offer | 709/203 |
| 2002/0072355 | A1* | 6/2002 | Jeong et al. | 455/419 |
| 2002/0177448 | A1 | 11/2002 | Moran et al. | |
| 2006/0223495 | A1 | 10/2006 | Cassett et al. | |

(Continued)

FOREIGN PATENT DOCUMENTS

| | | |
|---|---|---|
| CN | 1604665 A | 4/2005 |
| CN | 1691802 A | 11/2005 |
| EP | 0 417 944 A | 3/1991 |

(Continued)

OTHER PUBLICATIONS

International Search Report, PCT/FI2008/050505, mailed Dec. 5, 2008.
European Search report, EP 07 39 7032.9, mailed Feb. 14, 2008.

*Primary Examiner* — Kiet Doan
*Assistant Examiner* — Michael T Vu
(74) *Attorney, Agent, or Firm* — Ziegler IP Law Group, LLC.

(57) ABSTRACT

A mobile telecommunication device that is associated with a mobile telecommunication subscription periodically produces a status report with at least one detail about the mobile telecommunication device and an identification of the subscription associated with the mobile telecommunication device; and sends the status report to a tracking element. The tracking element receives periodical status reports from a set of mobile telecommunication devices, each status report having at least one detail about respective mobile telecommunication device and an identification of the subscription associated with the mobile telecommunication device. The tracking element further monitors the received status reports and determines whether a reporting trigger is met.

12 Claims, 4 Drawing Sheets

(56) References Cited

U.S. PATENT DOCUMENTS

2006/0293029 A1 12/2006 Jha et al.
2007/0024440 A1* 2/2007 Moran et al. .............. 340/539.13
2007/0060200 A1* 3/2007 Boris et al. .................... 455/558

FOREIGN PATENT DOCUMENTS

| GB | 2 332 340 A9 | 6/1999 |
| WO | 9743866 A2 | 11/1997 |
| WO | 2005018250 A1 | 2/2005 |

\* cited by examiner

TRACKING MOBILE COMMUNICATION DEVICES

BACKGROUND

1. Field

The aspects of the disclosed embodiments generally relate to tracking mobile communication devices.

2. Brief Description of Related Developments

Mobile phones have converged for some time towards computers. Various modern mobile phones are capable of using the internet, maintaining a calendar synchronized with an office system and presenting mail attachment files in common office program formats such as presentations, word processor and spreadsheet application formats. Such modern phones differ from Personal Digital Assistants (PDA) mainly by providing mobile telecommunications connectivity. As such, the modern phones used in business often contain confidential and sensitive information. However, even modern smart phones are relatively inexpensive and they become quickly outdated due to the fast progress in this technical field. The old phones have little commercial value for their owners as equipment even though the value of the information they contain may be substantial, at least the cost to business of losing their sensitive information may be significant. Understandably old smart phones are often relocated within a company in which they were owned or even out of the company to relatives and friends of intended users. Before handing over a smart phone to a friend or relative, employees seldom perform adequate clearing of sensitive data so that the information is certainly not recoverable. This risk that a phone is handed over to another person by its user becomes the higher the longer the phone has been out of daily use.

Modern phones are also capable of executing third party applications. The capability to run third party applications enables a host of new features and services. Unfortunately, ability to run third party applications may enable malicious or erroneous applications to endanger the data security of the phone. For instance, a badly behaving application might expose user data, email messages or calendar entries to other people either over short range connections such as Bluetooth or in the worst case by sharing or allowing access to the data over the internet. While it is impossible to anticipate dangerous applications before they are created, it may be possible to adapt the operating system of the mobile phone to prevent operation of some applications that are known to risk information security. For private phone owners, it is up to each owner how to act when new information security risks arise and operating system updates become available. For large organizations, it may be impossible or too onerous to monitor their entire base of currently used mobile phones. Hence, even if an organization should update certain mobile equipment, it may require undue amount of manual work to determine those phones that should be subjected to the update.

the aspects of the disclosed embodiments advantageously avoid and/or mitigate the problems associated with the prior art.

SUMMARY

According to a first aspect of the disclosed embodiments there is provided a method in a mobile telecommunication device, wherein the mobile telecommunication device is associated with a mobile telecommunication subscription, characterized by periodically:

producing a status report comprising at least one detail about the mobile telecommunication device and an identification of the subscription associated with the mobile telecommunication device; and sending the status report to a tracking element.

Advantageously, by periodically producing and sending the status report with one or more details about the mobile telecommunication device together with the identification of the subscription, it may be possible to periodically verify by the tracking element whether a given mobile telecommunication device is still in use, to detect the current operating system version of the mobile telecommunication device and to detect the subscription associated with the mobile telecommunication device. Hence, it may be possible to identify mobile telecommunication devices which form a data security risk due to no use or changed subscription indicative of passing over to other user. Moreover, it may be possible to maintain a relatively up-to-date database of current base of mobile telecommunication devices so that desired operating system updates can be directed to those mobile telecommunication devices which benefit from updating.

The intervals between subsequent status reports need not be constant. Hence, it should be appreciated that the term periodically may be interpreted as repeated or recurring operation regardless whether the status reports are sent according to lapsed time or according to meeting some time-independent threshold.

The report may be sent using short message service. Advantageously, the short message service is ubiquitous and implemented in most of modern mobile phones. Also the A-subscriber number is typically passed to a recipient together with the message so that the identification of the subscription may be automatically attached to the report. By using the A-subscriber number as the identification of the subscriber it is possible to provide common and reliable identification of the current subscription. Hence, passing over of the mobile telecommunication device to another user with another subscriber identity module (SIM) and another associated subscriber may be easily detectable.

The report may be encrypted. Advantageously, the encryption may help to protect privacy of the user and/or provide some protection against sending manipulated reports to the tracking element.

The method may comprise prompting for a confirmation from a user of the mobile telecommunication device before starting to periodically perform said producing and sending of status reports.

The method may be provided by a computer program and the prompting may take place before installing the computer program so that the program is only installed after confirmation by the user.

The method may comprise obtaining a client identity associated with the client. The client identity or a derivative thereof may be included in the status reports. The client identity may facilitate correlating the reports related to the client. Moreover, the client identity may enable recording a new mobile phone for the identified client and/or help to filter out malicious messages at the tracking element.

The at least one detail about the mobile telecommunication device may comprise any of: international mobile equipment identity; information related to hardware of the mobile telecommunication device; information related to software that is in use by the mobile telecommunication device; and any combination thereof.

The client identity and/or the at least one detail may be used as an encryption key if the status report is encrypted. The encryption key is indirectly passed in a concealed fashion to the tracking element. Hence, a client identity and/or a detail related to the mobile telecommunication device may be protected to some extent from unauthorized use.

The encryption may be independent of the client identity and of the at least one detail. Advantageously, such independent encryption enables taking into use of the sending of status reports in new telecommunication network subscriptions and/or mobile telecommunication devices without need for providing any prior indication of them to the tracking element.

The method may comprise sending a status report responsive a meeting a predetermined triggering condition such as powering on the mobile telecommunication device, detecting a change in the configuration of the mobile telecommunication device and installing an application to the mobile telecommunication device.

According to a second aspect of the disclosed embodiments there is provided a mobile telecommunication device associated with a mobile telecommunication subscription, characterized in that the mobile telecommunication device is configured to periodically:
producing a status report comprising at least one detail about the mobile telecommunication device and an identification of the subscription associated with the mobile telecommunication device; and
sending the status report to a tracking element.

According to a third aspect of the disclosed embodiments there is provided a computer program stored in a computer readable medium, the computer program comprising computer executable program code for controlling a mobile telecommunication device, wherein the mobile telecommunication device is associated with a mobile subscription, characterized in that the computer program comprises computer program code configured to enable the mobile telecommunication device to periodically:
producing a status report comprising at least one detail about the mobile telecommunication device and an identification of the subscription associated with the mobile telecommunication device; and
sending the status report to a tracking element.

According to a fourth aspect of the disclosed embodiments there is provided a method for tracking mobile telecommunication devices associated with respective mobile subscriptions, characterized in that the method comprises:
receiving periodically status reports from the mobile telecommunication devices, each status report comprising at least one detail about respective mobile telecommunication device and an identification of the subscription associated with the mobile telecommunication device; and
monitoring the received status reports and determining whether a reporting trigger is met.

The determining whether a reporting trigger is met may comprise detecting changes in the identification of the subscription or in the at least one detail about the mobile telecommunication device.

Advantageously, the method of the fourth aspect may enable detecting change in subscription associated with a mobile telecommunication device that is being tracked.

The determining whether a reporting trigger is met may comprise detecting changes in the mobile telecommunication device such as changes in operating system.

Advantageously, by detecting changes in the mobile telecommunication device the tracking element enables maintaining an automatically updated status of hardware and/or software of numerous mobile telecommunication devices. Based on the automatically updated status, it is possible to direct automatic or manual patches to the software and/or enable or disable features of mobile telecommunication devices.

The method may comprise determining as missing mobile telecommunication devices such mobile telecommunication devices which have not sent the status reports as expected.

The method may comprise statistically analyzing the status reports to determine such hardware and software combinations which cause increased instability of the phones. The instability may be indirectly concluded if the phones are configured to send a status report on each booting up. Alternatively, or additionally, the phones may be configured to send a status report if exceptionally many messages are sent to external recipients, if the memory starts to fill without normal explanation (e.g. video camera recording), or other behavior of the phone 120 appears to be unusual. The identification of instability may enable calling for repair or virus removal so that it may be possible to substantially inhibit or reduce possible indirect damage to the phones and to other computer network.

The method may comprise identifying individual phones which transmit statistically significant excess of status report compared to other phones with similar hardware and software configuration. The identifying of higher frequency of status reports may help to identify a hardware problem or virus at the reporting phone.

According to a fifth aspect of the disclosed embodiments there is provided a tracking element for tracking mobile telecommunication devices associated with respective mobile subscriptions, characterized in that the tracking element is configured to:
receiving periodically status reports from the mobile telecommunication devices, each status report comprising at least one detail about respective mobile telecommunication device and an identification of the subscription associated with the mobile telecommunication device; and
monitoring the received status reports and determining whether a reporting trigger is met.

The tracking element may be communicatively connected with the mobile telecommunication devices. The tracking element may comprise a server computer communicatively connected with the mobile telecommunication devices via at least one of the internet and one or more mobile communications networks.

According to a sixth aspect of the disclosed embodiments there is provided a computer program stored in a computer readable medium, the program comprising computer executable program code for controlling a tracking element to track mobile telecommunication devices associated with respective mobile subscriptions, characterized in that the program comprises computer executable program code configured to enable the tracking element:
receiving periodically status reports from the mobile telecommunication devices, each status report comprising at least one detail about respective mobile telecommunication device and an identification of the subscription associated with the mobile telecommunication device; and
monitoring the received status reports and determining whether a reporting trigger is met.

The computer executable program code may consist of program code executable by any one of the following: a multipurpose processor; a microprocessor; an application specific integrated circuit; a digital signal processor; and a master control processor.

Various embodiments of the disclosed embodiments have been illustrated only with reference to certain aspects of the disclosed embodiments. It should be appreciated that corresponding embodiments may be applied to other aspects as well.

BRIEF DESCRIPTION OF THE DRAWINGS

The aspects of the disclosed embodiments will be described, by way of example only, with reference to the accompanying drawings, in which.

DETAILED DESCRIPTION OF THE DISCLOSED EMBODIMENTS

Some aspects of the disclosed embodiments are next illustrated in sake of simplicity by using a mobile telephone, particularly GSM phone, as an example of a suitable user terminal. It should be appreciated that the aspects of the disclosed embodiments do not require voice communications capability and as such is equally usable for cellular communications data cards for laptop computers and internet enabled personal digital assistants (PDA) among many other devices.

Figure 1:
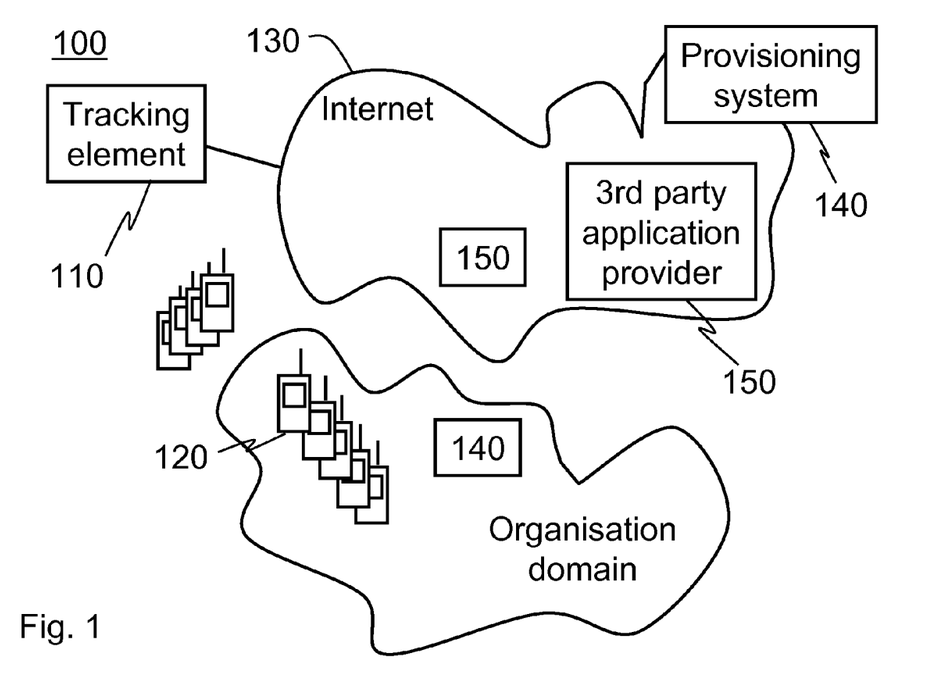
FIG. 1 shows a system according to an aspect of the disclosed embodiments.

FIG. 1 shows a system 100 according to an aspect of the disclosed embodiments. The system comprises a tracking element 110, sets of mobile phones 120, and a data network 130 such as the internet for allowing communication between the phones 120 and the tracking element 110. The sets are grouped so as to resemble the phones owned by different organizations. FIG. 1 also shows provisioning systems 140 and third party application providers 150. One provisioning system 140 is drawn into a domain of a corporation and another into the internet. The third party application providers are drawn into the internet, although some providers may distribute applications via off-line means such as data discs, memory cards, or even by activating pre-installed applications.

Figure 2:
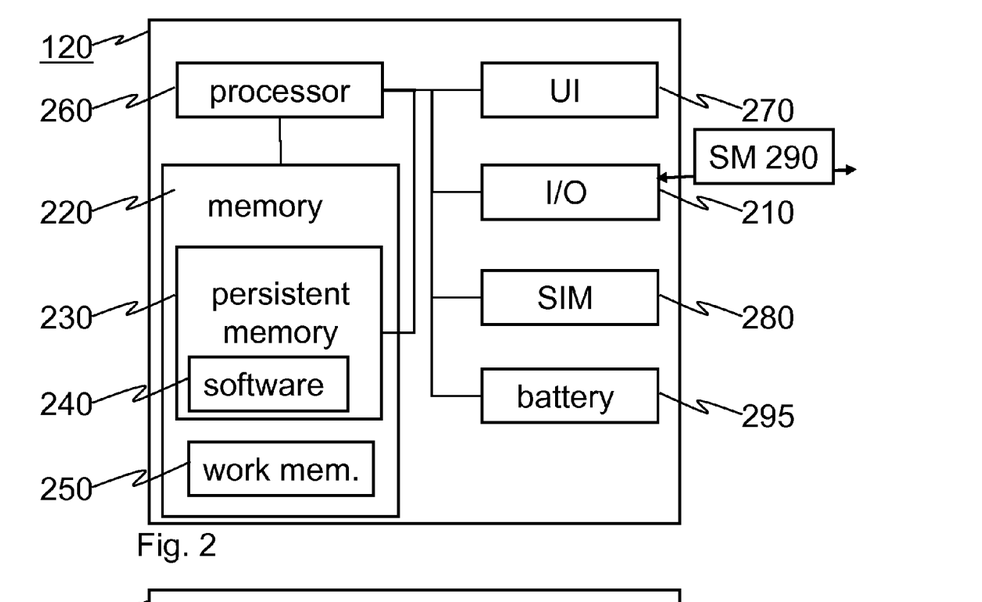
FIG. 2 shows a block diagram of a mobile telephone suitable for operating in the system shown in FIG. 1.

FIG. 2 shows a block diagram of a mobile telephone 120 suitable for operating in the system shown in FIG. 1. The phone 120 comprises a typical communication circuitry 210 for cellular telephony and also for internet protocol communications, a memory 220 including a persistent memory 230 for storing operating system and application data 240 and a work memory 250. The application data comprises a computer program that is adapted to control the operation of its host device (the phone 120). The program is typically executable on phones of different make and model. The program consist of binary code or the computer may comprise code intended for interpreting by an interpreter, in which case the application data 240 further comprises the interpreter. A substantial extent of universality may be achieved by using Java® or Java script, for instance. The phone 120 further comprises a processor 260 for controlling the operation of phone in accordance with the operating system and the application data. The phone 120 further comprises a user interface 270 with a display and text input such as keyboard, key pad or speech recognition circuitry. Moreover, the phone 120 comprises a Subscriber Identity Module (SIM) 280 configured to provide the phone with a subscriber number usually referred to as a phone number. In case of originated calls, the phone number is referred to as A-subscriber number. The phone 120 is capable of sending short messages 290 which include the subscriber number and other data. The phone typically further comprises a battery 295 for powering its components during mobile use. The operation of the phone 120 is described with more detail in the following text in connection with FIG. 4.

Figure 3:
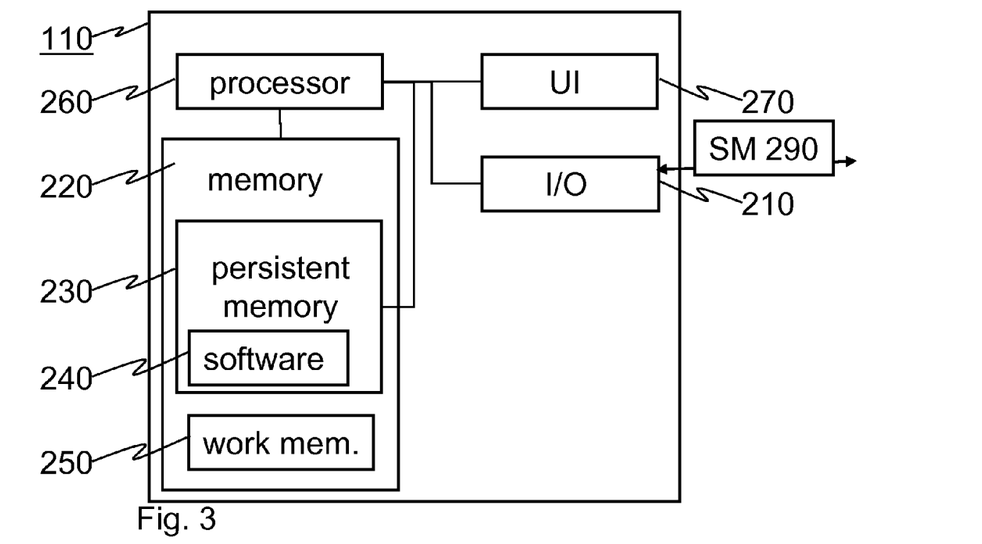
FIG. 3 shows a block diagram of a tracking element suitable for operating in the system shown in FIG. 1.

FIG. 3 shows a block diagram of a tracking element 110 suitable for operating in the system shown in FIG. 1. The tracking element is typically a server within a logistics management system, although the tracking element 110 may be built as any discrete or distributed functionality. The tracking element typically comprises following functional elements: an input/output (IO) function 210, a memory 220 including a persistent memory 230 for storing operating system and application data 240, and a work memory 250. The tracking element 110 further comprises a processor 260 for controlling the operation of phone in accordance with the operating system and the application data. While the tracking element 110 typically is far more powerful a unit than the phone 120, like numbers are used to denote like functions such as processor and memory, even if in practice the components used may greatly differ between the phone 120 and in the tracking element 110. For instance, it is appreciated that unlike with software directed for controlling phones 120, the software or application data in the tracking element is typically optimized for its platform. The operation of the tracking element 110 is described with more detail in the following text in connection with FIG. 5.

Figure 4:
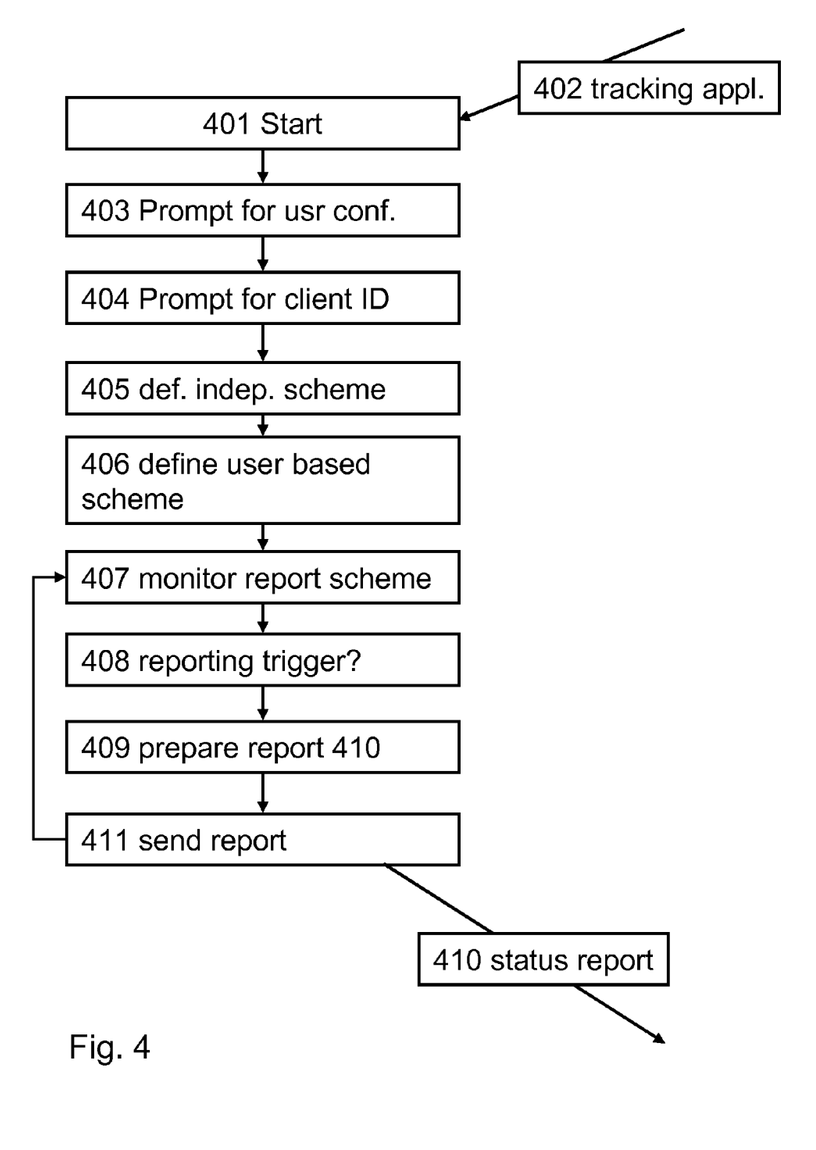
FIG. 4 shows a flow chart of the operation of a mobile telephone in accordance with an aspect of the disclosed embodiments.

FIG. 4 shows a flow chart of the operation of a mobile telephone 120 in accordance with an aspect of the disclosed embodiments. At start 401, the mobile phone receives a tracking application 402. The tracking application may be provided to the phone 120 in a variety of different ways. The file may be directly received by the phone 120 using, for instance, email, multimedia messaging service, web browser download, or provisioning based delivery. Alternatively, the file may be provided to the phone 120 by the user so that the file is first provided to the user's disposal using, for instance, an intranet storage, email or portable memory medium carrying the software such as memory card, optical disc, or Universal Serial Bus (USB) stick. Still alternatively, the tracking application 402 may be pre-installed and activated by the user, optionally with a verification code to enable activation of the tracking application.

Regardless how the tracking application 402 is provided to the phone 120, typically the phone prompts 403 for confirmation to start using the tracking application 402. Moreover, the phone usually prompts 404 for a client identification in order to facilitate the further processing as will become apparent in connection with description of FIG. 5.

When the tracking application 402 has been taken to use at the phone 120 after optional prompts 403 and 404, the tracking application starts sending periodical status reports. The tracking application 402 defines 405 either independently or based on user contribution a reporting scheme 406 according to which reports are to be sent. The tracking application 402 then starts to follow 407 the reporting scheme and on detecting 408 a reporting trigger such as meeting a predetermined criterion such as powering on the phone 120 or a reporting interval being lapsed since previous reporting, the tracking application 402 prepares 409 a status report 410 and then sends 411 the tracking report 410 to the tracking element 110.

The reporting trigger may also or alternatively involve detecting a change in a cell identifier. The change may be monitored with a given interval such as 15 min, 1 hour, daily etc. The change in the cell identifier may be detected by comparing a new cell identity to a predetermined number (e.g. 10) of previously used cells. If the cell is not among these previously used cells, the sending of the tracking report may be triggered. The triggering may also apply any combination of these features.

The status report 410 is advantageously sent using short messaging service or an analogous service that enables sending information so that an indication of the subscriber is available to the recipient. For instance, in Symbian® Series 60, it is possible to produce the status reporting with an additional application. The status report typically contains an equipment code such as an International Mobile Equipment Identity (IMEI) code, the sizes of installed memory cards and/or current operating system version. When the report is sent using SMS, the SMS normally adds the A-subscriber number to the short message header so that the subscription used and indirectly the user of the mobile equipment will be identified to the tracking element 110.

In an aspect of the disclosed embodiments, the status report 410 is encrypted. It may be advantageous to use a detail related to the mobile telecommunication device equipment (such as the IMEI) as an encryption key. Hence, the status report can only be successfully decoded by the tracking element 110 if the report has been sent by the phone 120 that is associated with the subscription from which the status report is received. Moreover, if the A-subscriber number is used as an index, the client identity may be used as an encryption key in addition to or alternatively to the detail related to the mobile telecommunication device equipment, as then the client identity is not needed to correlate the status report with a client to whose equipment the report is related to.

In an alternative embodiment, the encryption is independent of the client identity and of details related to the phone 120. Instead, any generic encryption such as character code offsetting may be employed. Such generic encryption may basically scramble the information sufficiently with a very low computational cost at the phone 120 and at the tracking element 110. Advantageously, independent encryption enables taking into use of the sending of status reports in new telecommunication network subscriptions and/or mobile telecommunication devices without need for providing any prior indication of them to the tracking element. For instance, when an organization sources new phones and subscriptions, these may be freely taken into use. Once the phones are provided with the tracking application and optionally with the client identity, the phones start sending status reports to the tracking element 110 and thereby record their presence to the tracking element 110.

Sent status reports may be processed by the phone 120 like normal user-created messages. Copies of sent status reports may be placed into a corresponding folder so that the user may see the reports, in which case it is useful to include in the reports at least a brief user understandable indication of the purpose of the report message to avoid confusing the user. Alternatively, sent status report messages may be concealed from the user by suitably controlling the phone 120 by the tracking application 402.

The reporting scheme may simply consist of sending a report with a constant interval. If sending of a status report fails due to any reason (phone switched off, in flight profile so that transmitter is off, or a communication error occurs in the transmission), the phone 120 may attempt sending the report over a given retransmission interval and/or maximum number of transmissions. Limiting the number of retransmissions may be advantageous as often the transmissions are cost bearing.

In another embodiment, the reporting scheme may be configured by the user or adaptively defined based on determined usage of the phone 120 so that the reports are scheduled for moments when the phone 120 is typically ready for transmissions.

In order to save battery, the scheme may contain a window during which the transmission is only made when the phone is connected to a charger or mains power supply, or when there is no congestion in communications channels used. The congestion may be determined statistically or empirically from measured radio interference, for example.

Figure 5:
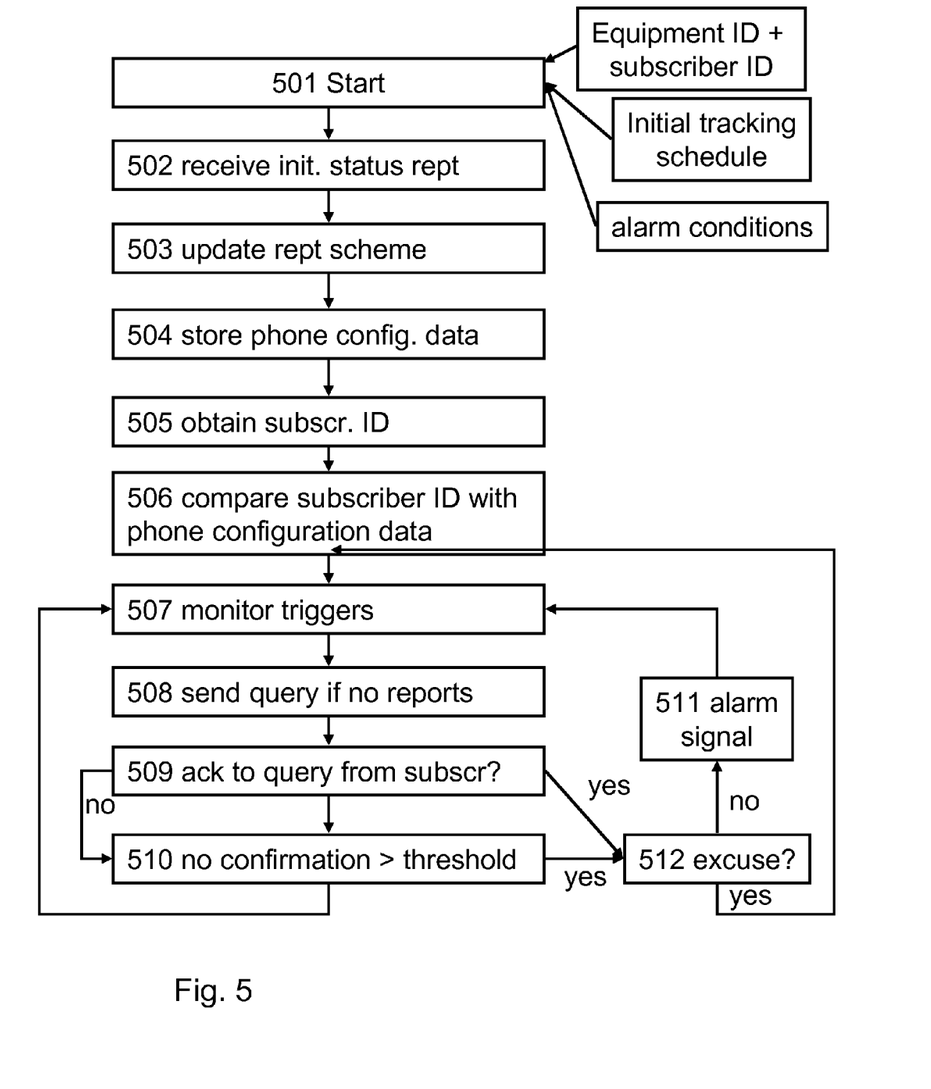
FIG. 5 shows a flow chart of the operation of a tracking element in accordance with an aspect of the disclosed embodiments.

FIG. 5 shows a flow chart of the operation of a tracking element 110 in accordance with an aspect of the disclosed embodiments. At start 501, the tracking element 110 is configured 501 to track a given mobile phone 120. The configuration typically involves providing the tracking element 110 with an equipment identifier and subscriber identifier. The tracking element 110 is additionally provided with initial status report schedule and alarm conditions defined for the mobile phone 120. The initial schedule and alarm conditions may be common for all mobile phones, common between phones within an organization to which the phones belong, or common to a given group of phones within an organization such as phones owned within or assigned to a particular organizational department.

During and after configuration 501, the tracking element 110 keeps on tracking numerous phones and receiving new configuration data. Here, the operation of the tracking element 110 is explained with reference to a single phone 120, while simultaneously the tracking element 110 normally serves a number of other tasks.

After the configuration 501, the tracking element 110 receives 502 an initial status report. The tracking element may obtain 503 from the initial status report an update to the status report scheme. If the tracking element 110 has not earlier record of the configuration of the phone 120, the tracking element 110 then stores 504 the data concerning the configuration of the phone 120. The tracking element 110 obtains 505 a subscriber identifier from the status reports and compares 506 the subscriber identifier with its record.

The tracking element follows 507 the alarm conditions, typically on a daily bases. The tracking element 110 may, for instance, check whether one or more status reports according to the reporting scheme have not been received and according to the alarm conditions. If a given number of reports are missing, the tracking element 110 may query 508 for the subscriber associated with the phone 120 by sending a short message to the subscriber with a delivery request. In GSM, the SMS system should acknowledge whether the short message can or cannot be delivered to the subscription. If the message is acknowledged 509 but no status reports are received, it may be assumed that the phone 120 no longer has the SIM it should contain (the subscription is now connected to another phone) or that the tracking application 402 is not operable. On the other hand, an unclear situation may prevail in which no response is received so the subscriber is presumably connected to a phone which is switched off, but there is no way to know whether the subscription is connected to the phone 120. If this unclear situation exceeds 510 pre-defined alarm limit, the tracking element 110 may produce an alarm signal 511 indicative of the unclear situation. Before producing 511 the alarm signal of for unclear situation, the tracking element 110 may query an accessibility database such as a calendar to check 512 whether the subscription associated with the phone 120 has a good reason for missing status reports (e.g. holiday or business trip to an area where the subscription is not used).

On following the alarm conditions, the tracking element 110 may compare the configuration of the phone 120 to a given list of configurations with one or more entries and produce an alarm signal if a match is found. This feature may be useful in identifying potentially exposed phones. It is known that already in the modern Symbian Series 60® platform provides the operating system version and the sizes of the memories (shown as disks). In addition or alternatively, a list of installed applications may be obtained by the tracking application 402. It is also possible to limit reporting of installed applications by selecting which applications shall be reported. The selection may be individual or collective. The selection of applications to be reported may be signaled to the phone 120 by the tracking element 110. The tracking element 110 may use the information about installed applications for collecting licensing information and/or for detecting harmful software.

Based on the alarm signal, the tracking element 110 may automatically send a query message to the user of the phone 120. The tracking element 110 may additionally or alternatively send a warning message to a predetermined address so as to warn about a potential risk. Moreover, in case that the phone 120 appears to be exposed to a safety risk, the tracking element 110 may initiate provisioning an update or security patch to the phone 120 and/or disabling one or more features of the phone so as to inhibit data leakage.

The tracking element 110 may be configured to perform statistical analysis based on received status reports in order to detect collective or individual exposure to malfunction. In case that all phones with a particular hardware and software combination produce significantly increased amount of restarting caused status reports, the tracking element 110 may conclude that combination as an error prone combination. After the problem is solved, a patch may be delivered by provisioning. In case that a few phones send significantly more often status reports than other phones with a similar hardware and software combination, it may be concluded that these phones may have an individual virus contamination or hardware problem such as too old battery.

According to an aspect of the disclosed embodiments, a tracking system is easy to take into use with normal compatible mobile phones regardless of the telecommunications operators used and also typically even from abroad. The messaging incurs typically marginal costs considering that the tracking application is very light and simple to install either by the users, by support personnel or using automated distribution. By using the tracking system, it can be quickly detected if a phone is removed from active use and becomes an information security risk. Further, it may be quickly detected if some phones become instable so that a repair may be arranged even before the users realize their phones have had any problem at all.

It should be appreciated that in this document, words comprise, include and contain are each used as open-ended expressions with no intended exclusivity.

The foregoing description has provided by way of non-limiting examples of particular implementations and aspects of the disclosed embodiments a full and informative description of the best mode presently contemplated by the inventors for carrying out the disclosed embodiments. It is however clear to a person skilled in the art that the disclosed embodiments are not restricted to details of the aspects presented above, but that it can be implemented in other embodiments using equivalent means without deviating from the characteristics of the embodiments disclosed herein.

Furthermore, some of the features of the above-disclosed embodiments could be used to advantage without the corresponding use of other features. As such, the foregoing description should be considered as merely illustrative of the principles of the disclosed embodiments, and not in limitation thereof. Hence, the scope of the disclosed embodiments is only restricted by the appended patent claims.

What is claimed is:

1. A method in a mobile telecommunication device, wherein the mobile telecommunication device is associated with a mobile telecommunication subscription provided by a subscriber identity module, the method comprising:

storing in the mobile telecommunication device a tracking application;

storing in the mobile telecommunication device a client identifier associated with a client whose equipment the mobile telecommunication device is; and storing in the mobile telecommunication device a reporting scheme;

the method further comprising periodically, according to the reporting scheme;

producing by the tracking application a status report in the mobile communication device, the status report comprising the client identifier and at least one detail about the mobile telecommunication device, the at least one detail about the mobile telecommunication device comprising a combination of information related to hardware of the mobile telecommunication device and information related to software that is in use by the mobile telecommunication device; and sending the status report to a tracking element;

wherein the producing of the status report and the sending of the status report are performed so that the status report passes to the tracking element an identification of the subscription associated with the mobile telecommunication device.

2. The method according to claim 1, wherein the status report is sent using short message service.

3. The method according to claim 1, the method further comprising additionally sending the status report responsive to detecting a predetermined change in a current cell.

4. The method of claim 1, wherein the tracking application defines a reporting scheme and delivers the status report based on a reporting trigger.

5. A mobile telecommunication device associated with a mobile telecommunication subscription provided by a subscriber identity module, comprising:

a non-transitory memory device configured to store a tracking application; and a processor configured, based on the tracking application, to:

store a client identifier associated with a client whose equipment the mobile telecommunication device is;

store a reporting scheme; and to periodically, according to the resorting scheme:

produce a status report in the mobile telecommunication device, the status report comprising at least one detail about the mobile telecommunication device and the client identifier, the at least one detail about the mobile telecommunication device comprising a combination of information related to hardware of the mobile telecommunication device and information related to software that is in use by the mobile telecommunication device; and send the status report to a tracking element;

wherein the processor is configured to perform the producing of the status report and the sending of the status report so that the status report passes to the tracking element an identification of the subscription associated with the mobile telecommunication device.

6. The mobile telecommunication device according to claim 5, wherein the mobile telecommunication device is configured to send the status report using short message service.

7. The mobile telecommunication device according to claim 5, wherein the mobile telecommunication device is configured to additionally send the status report responsive to detecting a predetermined change in a current cell.

8. The mobile telecommunication device according to claim 5, wherein the processor is configured to encrypt the status report.

9. The mobile telecommunication device according to claim 5, wherein the mobile telecommunication device is further configured to prompt for a confirmation from a user of the mobile telecommunication device before starting to periodically perform said producing and sending of status reports.

10. The mobile telecommunication device according to claim 5, wherein the mobile telecommunication device is further configured to use the tracking application program subject to a user confirmation.

11. The mobile telecommunication device according to claim 5, wherein the mobile telecommunication device is further configured to obtain a client identifier associated with a client and to indicate the client identifier by the status report.

12. A computer program stored in a non-transitory computer readable medium, the computer program comprising computer executable program code for controlling a mobile telecommunication device;

wherein the mobile telecommunication device is associated with a mobile subscription and a subscriber number provided in a subscriber identity module of the mobile communication device, and wherein:

the computer program comprises computer program code configured to enable the mobile telecommunication device to:

store a client identifier associated with a client whose equipment the mobile telecommunication device is;

store a reporting scheme; and and to periodically, according to the reporting scheme:

produce a status report in the mobile telecommunication device, the status report comprising at least one detail about the mobile telecommunication device and the client identifier, the at least one detail about the mobile telecommunication device comprising a combination of information related to hardware of the mobile telecommunication device and information related to software that is in use by the mobile telecommunication device; and send the status report to a tracking element;

wherein the computer program further comprises computer program code configured to enable the mobile telecommunication device to perform the producing of the status report and the sending of the status report so that the status report passes to the tracking element an identification of the subscription associated with the mobile telecommunication device.

* * * * *